United States Patent [19]

Scholz et al.

[11] Patent Number: 5,325,397
[45] Date of Patent: Jun. 28, 1994

[54] ERROR RATE MONITOR

[75] Inventors: Jason B. Scholz, North Adelaide; Stephen C. Cook, Modbury North; Timothy C. Giles, Gilberton, all of Australia

[73] Assignee: The Commonwealth of Australia, Canberra, Australia

[21] Appl. No.: 854,595
[22] PCT Filed: Dec. 6, 1990
[86] PCT No.: PCT/AU90/00581
  § 371 Date: Jun. 8, 1992
  § 102(e) Date: Jun. 8, 1992
[87] PCT Pub. No.: WO91/09482
  PCT Pub. Date: Jun. 27, 1991

[30] Foreign Application Priority Data

Dec. 7, 1989 [AU] Australia ............... PJ7774

[51] Int. Cl.$^5$ ............... H04B 3/46; H04B 17/00
[52] U.S. Cl. ............... 375/10; 375/76; 375/94; 371/5.1
[58] Field of Search ............... 375/24, 17, 76, 94; 455/135; 371/5.1, 5.5, 20.1, 20.4, 20.5

[56] References Cited

U.S. PATENT DOCUMENTS 3,596,245 7/1971 Finnie et al. ............... 340/146.1
4,384,354 5/1983 Crawford et al. ............... 375/10
4,791,653 12/1988 McFarland et al. ............... 375/115

FOREIGN PATENT DOCUMENTS 21882 3/1989 Australia.
2154104 8/1985 United Kingdom.

OTHER PUBLICATIONS

J. B. Scholz, "Trial Results of Novel Bit Error Rate Monitor Scheme over Skywave HF Link", Electronics Letters, Sep. 12, 1991, vol. 27, No. 19, pp. 1730–1732.
Newcombe & Pasupathy, "Error Rate Monitoring for Digital Communications", Proceedings of the IEEE, vol. 70, No. 8, Aug. 1982, pp. 805–826.
Michel C. Jeruchim, "Techniques for Estimating the Bit Error Rate in the Simulation of Digital Communication System", IEEE Journal of Selected Areas in Communication, vol. 2, SAC-2, No. 1, Jan. 1984, pp. 153–169.
WO, A, 89/03142, (Siemens AG), Apr. 6, 1989.
Patents Abstracts of Japan E-1012, p. 47, JP, A 2-241249, (NEC Corp.), Sep. 25, 1990.
Gooding, D. J., *IEEE Transactions on Communication Technology*, "Performance Monitor Techniques for Digital Receivers Based on Extrapolation of Error Rate", vol. COM-16, No. 3, Jun. 1968.

*Primary Examiner*—Curtis Kuntz
*Assistant Examiner*—Bryan Webster
*Attorney, Agent, or Firm*—Cushman, Darby & Cushman

[57] ABSTRACT

A method of assessing a link for a digital communication system and providing a value for a channel or link state parameter, particularly bit error rate, and apparatus for the same, in which an estimate of the probability density function for the channel or link is obtained by categorising decision variables into threshold categories, and comparing the estimated probability density function with stored known probability density functions with each stored probability density function the value of the channel parameter being monitored is stored. The value of the channel parameter being monitored is determined by selecting the value associated with the stored probability density function closest resembling the estimated probality density.

50 Claims, 10 Drawing Sheets

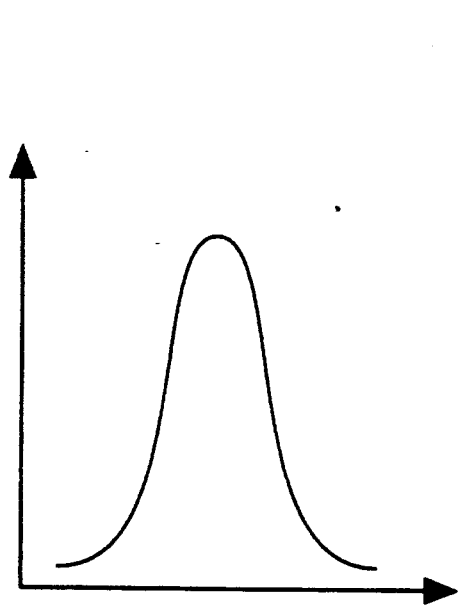
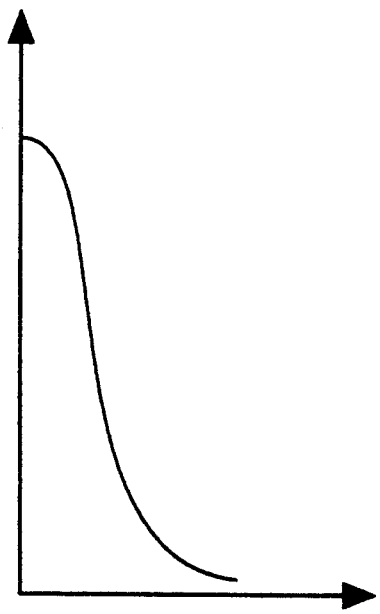
Fig 10 (a)  Fig 10 (b)
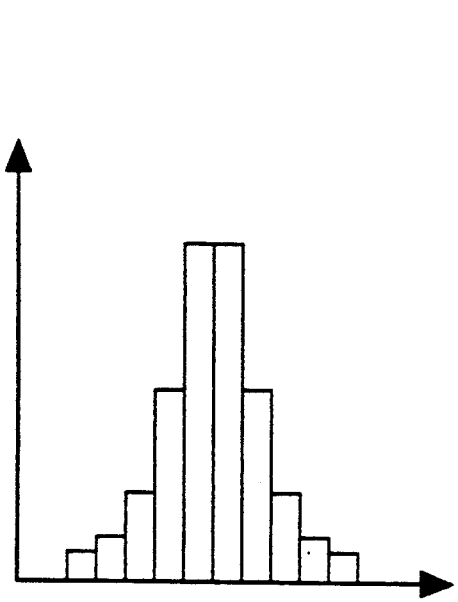
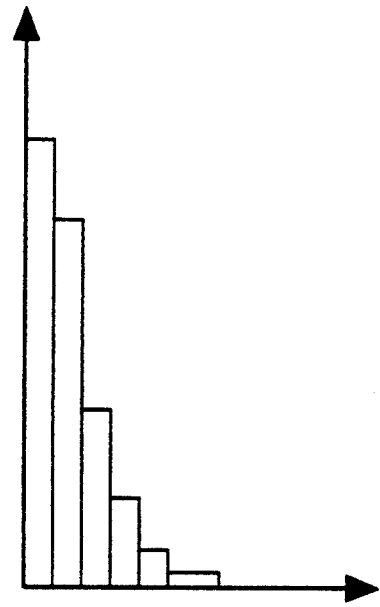
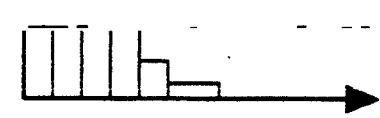
Fig 10 (c)  Fig 10 (d)

ERROR RATE MONITOR

BACKGROUND OF THE INVENTION

1. Field of the Invention

The invention described herein relates to a digital communication channel or link parameter monitor which can be used as a Bit Error Rate Monitor.

A communication channel or link parameter monitor can be used to assess a digital communication link or channel. By such assessment, information can be determined as to the nature of the Bit Error Rate associated with transmission of digital signals across the communication channel or link, as well as other channel or link parameters such as signal to noise ratio, fading and the type of noise affecting the link.

The present invention can be applied to any channel and terminal equipment through which digital signals are transmitted which constitute a digital communication channel or link and may be applied to any digital service including voice, data and video.

The present invention is not limited to the radio, telephony and like communication systems but can find application in any system where communication occurs and where continuous signals are used to communicate information, and such signals are interpreted into one of a plurality of symbols. Such systems include for example, optical disk reading, digital magnetic tape reading, compact disk audio disks and magnetic hard disks.

It will be appreciated that whilst the present invention is described herein in relation to communication between binary digital systems, it can be applied to communication between digital systems characterised by another number system base; for example ternary.

The present invention was conceived whilst conducting research into methods of determining a bit error rate associated with digital communication links. It has been realised that the present invention is applicable to a number of channel or link state parameters besides bit error rate. More will be said below in regard to the application of the present invention to other link state parameters.

2. Description of the Related Art

A link or channel state parameter is any parameter which characterises a communication link or channel. Examples of link state parameters are signal to noise ratio, eye pattern, interference type and bit error rate.

A communication channel is normally defined as the medium connecting a transmitter and a receiver. In the case of a radio link, the channel is often the atmosphere between the transmitting antenna and the receiving antenna; for an optical link, the channel would be the optical fibre.

A communication link is normally considered to include the following physical stages of a communication system: encoder, modulator, transmitter, channel, receiver, demodulator and decoder. The term link herein, unless contrary to the context, means the stages of a communication link listed above except for the decoder. This is because the received signal is tested prior to decoding. It will be appreciated that the majority of disturbances occur prior to this last stage.

In the situation of reading magnetic tape which has information digitally stored upon it, the channel mentioned above is the magnetic medium and a decision variable is the continuous valued signal which the detector interprets as digital information.

A demodulator within a receiver of a digital communication system uses a decision variable to interpret what symbol was sent. Whilst not limiting the meaning of decision variable, a decision variable is the parameter of the received signal which the demodulator interprets as a symbol. As examples, in the case of binary phase modulation, a decision variable is the phase component of the received signal; for an amplitude modulated signal the decision variable is the amplitude of the received signal after matched filtering; and for quadrature amplitude modulation there are two decision variables associated with phase and amplitude of the received signal respectively. In baseband systems, decision variable recovery is achieved by a line decoder which may be considered as an equivalent, in this regard, to a demodulator.

A decision variable is a continuous valued signal which the demodulator decodes into discrete valued signals. The decision variable is a continuous valued signal because of noise and other disturbances affecting the transmission of a symbol from a transmitter to a receiver. The value that the decision variable can have due to the effect of such disturbances is considered to follow a probability density function. That is, there is a probability that the decision variable will be a certain value at any particular time. The decision variable, in general, can be considered as a continuous random variable.

As a consequence of the continuous valued nature of a decision variable the associated probability density function will be continuous, and in general will change from time to time.

Probability density functions are often drawn as a histogram. In keeping with accepted probability theory nomenclature, it will be understood that the term "histogram" herein includes data which may be used to draw a histogram.

A bit error rate monitor is used to monitor and measure the bit error rate associated with a communication channel and can be applied to any communication channel through which digital signals are transmitted.

A bit error rate of a link or channel is the number of information bits communicated over the link that are interpreted, when received, as being bits of a type different from that which was transmitted. For example, in a binary system, if a bit is interpreted as a "1" when it was sent as a "0", then a bit error has occurred, and the numerical ratio of the number of bits in error to the total number of bits sent over some period of time is the bit error rate.

There are two basic types of bit error rate monitors. First, there are Active Error Rate Monitors and secondly, there are Passive Error Rate Monitors.

Active error rate monitoring techniques require that a known data stream be transmitted through the communication channel. The received data stream is compared with the known data that should have been received. The number of data bits incorrectly received over a period time is the bit error rate.

This method requires the data communicated to be stopped and the test data stream to be sent, thus imposing overheads on the communication channel. A further problem with this method is that for reasonably accurate bit error rates, to be calculable a large number of bits forming the test data stream must be sent. The necessary measurement interval T can be expressed as $$T > \frac{10}{BER \times NET\ CHANNEL\ BIT\ RATE}$$

This measurement time is often prohibitively long even for quite high error rates on low rate channels, e.g. 33 minutes to determine a $10^{-4}$ bit error rate for a 50 bits per second link, or 17 minutes to determine a $10^{-8}$ bit error rate on a $10^6$ bits per second link. Further, as the standard deviation of the measured error counts may be approximated by the square root of the number of counts, even if 100 counts are registered then a 95% confidence interval is bounded by 75 and 125 counts (or approximately 25% of an order of magnitude).

Passive error rate estimation may be sub-divided into three basic categories. The first is used where forward error correction or error detection is employed. In this first case, the decoder may be interrogated for the bit error rate calculated from a number of detected bit errors over some measurement interval.

A major problem with this first method is that not all error patterns are detectable for a given code and a large amount of time must be spent counting the number of erroneous digits to give a statistically meaningful bit error rate. Also, the measurement time T is the same as for the active error rate measurement method. Consequently, a large amount of time must be spent counting the number of erroneous digits to give a generally useful bit error rate estimate.

The second category is one in which the signal parameters of the communication channel or link are measured. These could be a signal to noise ratio, fade rate, eye pattern opening, timing jitter, etc. As will be appreciated, all these methods are measuring parameters which are not directly related to the bit error rate. Consequently, a large error may be associated with this second of method because the measurements are not of the bit error rate but of other parameters which may not be directly related to the bit error rate, or may be highly sensitive to the channel or link statistics, or may be both highly sensitive and not directly related to the bit error rate.

In this second method, there is also a requirement that the relationship between channel parameters and bit error rate be known, and that bit error rate be solely dependent on measured channel parameters. The consequence of not meeting these stringent requirements is that estimations of the bit error rate may be inaccurate.

The final category of passive error rate monitoring schemes may be referred to as Pseudo-Error Rate Measurement. There are two forms, firstly, the Additive Noise Method and secondly, Lower Threshold Method.

The additive noise method is one in which White Gaussian Noise is added to a receiver decision variable or variables to increase the likelihood of exceeding a decision threshold. The receiver decision variable or variables, as mentioned above, is that signal or collection of signals just prior to the data decision threshold in any digital demodulator or baseband transmission scheme, and is the signal used to decide as to the most likely transmitted data bits.

Performing an EXCLUSIVE OR function between the pseudo-data stream and the normal demodulated data stream will thus produce approximately one pulse output per pseudo-error. The pseudo-data stream is the output of the receiver/demodulator which has had white Gaussian noise added to it. A given pseudo-error rate corresponds to an actual error rate, so from the pseudo-error rate an estimate of the actual bit error rate can be made using a look-up table.

The problem with this additive noise method is that if more than one class of link probability distribution is necessary, there will need to be a corresponding number of look-up tables. Further, it may be difficult to know what class of link probability distribution was present during a measurement interval.

The lower threshold method alternatively requires thresholds be set which are below the actual decision threshold. A counter is incremented each time the receiver decision variable, during a symbol period, exceeds a given decision threshold. The numerical ratio of the number of counts registered over some period of time to the total number of bits sent, is referred to as a pseudo-error rate. These pseudo-error rates, which will be greater than the actual error rate, are used to estimate the actual error rate by way of extrapolation.

The bulk of research into the Lower Threshold method was inspired by D. J. Gooding, "Performance Monitor Techniques for Digital Receivers Based on Extrapolation of Error Rate", IEEE Transactions on Communication Technology Vol COM-16 No. 3, June 1968. This research may be taken as the nearest known prior art.

The method described by Gooding requires the use of values for two or more counters with different thresholds which are then extrapolated to estimate the actual error rate. The extrapolation process is usually a linear extrapolation in a two dimensional space where the dimensions are the logarithm of pseudo-error rates versus a pre-determined function of threshold values.

The line is extrapolated in the function of threshold values dimension to the position where the threshold, value is the decision threshold then the logarithm or error rate is taken from the other dimension. This method is designed to extrapolate correctly for probability distributions of an exponential form.

Unfortunately, many probability distributions do not have an exponential form. Hence, the extrapolation distance must be short to estimate the bit error rate accurately. The same can be said of any model for the bit error rate using extrapolation be it an exponential model function or otherwise.

SUMMARY OF THE INVENTION

The invention herein uses a number of different thresholds as in the Gooding's case, but instead of extrapolating and therefore estimating the bit error rate, the counts are used to form a histogram which is an estimate of the probability density function. Once the probability density function of the decision variable is determined an associated bit error rate may be found.

This highlights the biggest difference between Gooding's approach and the approach of this invention. Instead of extrapolating on pseudo-error rate measurements to get the actual bit error rate, the probability density function is estimated, which may vary, and is then compared with stored values of expected possible link probability density functions. Each stored probability density function has stored an associated bit error rate. The bit error rate of the stored probability density function estimated to be the closest to the measured counts or histogram is taken as the estimate of the bit error rate for the existing link conditions.

In general, other link state parameters may be estimated, not only bit error rate. Once the stored probability density function closest resembling the measured histogram is found, then any associated link or channel state parameter may be estimated by being of a value stored in association with the selected probability function. To determine the associated link or channel state parameter or parameters of a probability function it may be calculated from theory, by numerical estimation or by performing tests.

A digital receiver receives signals from a transmission medium or channel. The signals are then processed to produce a decision variable or variables. From one signal, one or more decision variables may be produced per symbol period. A symbol may be in one or more dimensions; for example quadrature amplitude modulation has symbols defined in terms of phase and amplitude each of which are decision variables. A two dimensional decision variable is often called a phasor.

Each symbol sent through the channel is converted into one or more bits by the digital receiver. The values of the decision variable or variables determines the one or more bits that the digital receiver outputs.

Decision variables are continuous valued as opposed to bits which are discrete valued. The process of converting decision variable or variables into one or more bits is often done by comparing the decision variable or variables with a threshold. In a binary modulation scheme, if a decision variable exceeds a threshold, the bit is set to one state; if the decision variable is less than a threshold, the bit is set to the other state.

Hence, the invention may be said to reside in a method of assessing a link of a communication system including measuring at least one probability density function for transmission through an associated communication link or channel, and providing an output value or values, as the case may be, for a channel or link state parameter or parameters based upon calculations using the measured probability density function or functions.

Alternatively, the invention may be said to reside in a method of assessing a link of a communication system including the steps of:
  receiving a first signal;
  categorising at repetitive points in time a decision variable into a number of states;
  measuring a probability density function for the transmission of a symbol or symbols over a communication channel or link; and
  providing an output value or values, as the case may be, for a channel or link state parameter or parameters based upon calculations using the measured probability density function or functions.

In preference the invention is further characterised by including the steps of:
  selecting by comparison which of a plurality of stored probability density functions is best estimated by the measured probability density function; and
  producing an output value or values of known value or values associated with the selected probability density function in some intelligible form.

In preference, the step of measuring a probability density function is characterised by recording as a histogram value the occurrences or proportion of occurrences over a number of symbol transmissions that the decision variable is categorised as being a particular category; and the step of selecting is further charaterised by the stored probability density functions being for the same number of categories as the measured probability density function.

It will be appreciated that the stored probability density function may be stored as a greater number of categories. However, when the step of selecting is conducted two or more stored categories are combined so that the step of selecting is between probability density functions having the same number of categories.

Alternatively, the invention may be said to reside in a method of assessing a link of a communication system involving the steps of:
  receiving a first signal;
  forming at least one decision variable from the first signal, each decision variable having a characteristic which is useful in determining which of a plurality of possible symbols is being received;
  forming at least one measured probability density function of the value of the characteristic of an associated decision variable; and
  providing a second signal indicative of the form or magnitude or both of at least one channel or link state parameter associated with the digital communication system.

In preference the step of forming the measured probability density function or functions results in the measured probability density function or functions being in histogram form produced by the steps of:
  repetitively categorising the associated decision variable into categories dependent upon the value of the characteristic, where the categories consecutively divide the range of values that the characteristic can take and each category has an associated range being a sub-range of the range of values that the decision attribute can take; and
  recording for each category the number of times or proportion of times that the value of the characteristic is within the associated range of the category or the value of the characteristic is within or exceeds the region of the category.

In preference the invention can be further characterised by involving the steps of:
  comparing and selecting which of a plurality of stored probability density functions closest resembles the measured probability density function or functions; and
  providing as the second signal a stored value or values associated with the selected probability function.

In preference, the step of categorising the decision variables is conducted at the same time that a demodulator demodulates the characteristic into the symbol being received.

Alternatively the invention can be said to reside in apparatus for use in a digital communication system including:
  receiving means adapted to receive a first signal;
  demodulator means adapted to form at least one decision variable from the first signal each decision variable being characterised by a characteristic which is useful in determining which of a plurality of possible symbols is being received; and
  calculating means adapted to form at least one measured probability density function of the value of the characteristic of an associated decision variable, and to provide a second signal indicative of the form or magnitude or both of at least one channel or link state parameter associated with the digital communication system.

In preference, the calculating means is further adapted to:

form the measured probability density function or functions in histogram form by repetitively categorising the associated decision variable into categories dependent upon the value of the characteristic, where the categories consecutively divide the range of values that the characteristic can take, and each category has an associated range being a subrange of the range of values that the characteristic can take; and record for each category the number of times or proportion of times that the value of the characteristic is within the associated range of the category or the value of the decision variable is within or exceeds the region of the category.

In preference, the calculating means is further adapted to:

compare and select which of a plurality of stored probability density functions closest resembles the measured probability density function or functions; and provide as the second signal a stored value or values thereof associated with the selected probability function.

In preference, the calculating means is further adapted to categorise the decision variables at the same time that a demodulator demodulates the decision variable into the symbol being received.

Alternatively the invention may be said to reside in an apparatus for use in a digital communication system including:

signal generating means adapted to impress upon channel means a first signal;

signal detecting means adapted to detect the first signal;

signal conditioning means adapted to convert the first signal as detected into at least one output signal representative of a decision variable;

and for each output signal there are:

categorising means adapted to categorise the decision variable into categories dependent upon the value of the decision variable; counter means adapted to count the number of times the value of the decision variable is categorised as each of the categories;

measuring means adapted to measure a probability density function associated with the decision variable;

calculating means adapted to provide for at least one channel or link state parameter a parameter value dependent upon the measured probability density function.

Alternatively the invention may be said to reside in an apparatus for use in a digital communication system including:

transmitting means adapted to impress upon channel means a first signal;

receiving means adapted to receive the first signal;

demodulating means adapted to convert the first signal as received into at least one output signal representative of a decision variable;

and for each output signal there are:

categorising means adapted to categorise the decision variable into categories dependent upon the value of the decision variable;

counter means adapted to count the number of times the value of the decision variable is categorised as each of the categories;

measuring means adapted to measure a probability density function associated with the decision variable;

calculating means adapted to provide for at least one channel or link state parameter a parameter value dependant upon the measured probability density function.

Alternatively the invention may be said to reside in an apparatus for use in a digital communication system including:

receiving means adapted to receive a first signal;

signal conditioning means adapted to convert the first signal into at least one output signal representative of a decision variable;

and for each output signal there are:

categorising means adapted to categorise the value of the output signal into a plurality of categories;

counter means adapted to count the number of times the value of a output signal is categorised as each of the categories, the values of the counter means forming an estimate of the histogram of the link or channel probability density function;

memory means adapted to store the category values or values related to the category values for a plurality of known histogram of known probability density functions, along with the value or values of channel or link parameter or parameters associated with the known probability density functions;

calculating means adapted to compare and select which of the stored known probability density functions is best estimated by the values of the counter means; and display means adapted to display the channel or link parameter or parameters associated with the known probability density function best estimated by the values of the counter means.

In preference the invention can be further characterised by a plurality of known probability density functions stored in memory means, and the calculating means is adapted to compare and select which of the stored known probability density functions is best estimated by the values of the counter means.

The following embodiments utilise categories or counter bins that are equally spaced. This is not a limiting requirement of the invention. Provided the stored probability density functions and the scheme used to estimate or form the histogram of the link probability density function are in agreement then non-equal categories can be used.

Further, the following embodiments are described in reference to providing a measure of a bit error rate of a communication link. This is only for the sake of clarity and the provided output could be another channel or link state parameter which can be determined from the probability density function of the channel or link.

BRIEF DESCRIPTION OF THE DRAWINGS

The invention will now be described in more detail and as exhibited by preferred embodiments with reference to the following diagrams.

FIGS. 10(a)–10(d) illustrate as an example the form and associated histogram of a probability density function and of a category cumulative probability density function;

DETAILED DESCRIPTION OF THE PREFERRED EMBODIMENTS

Figure 1:
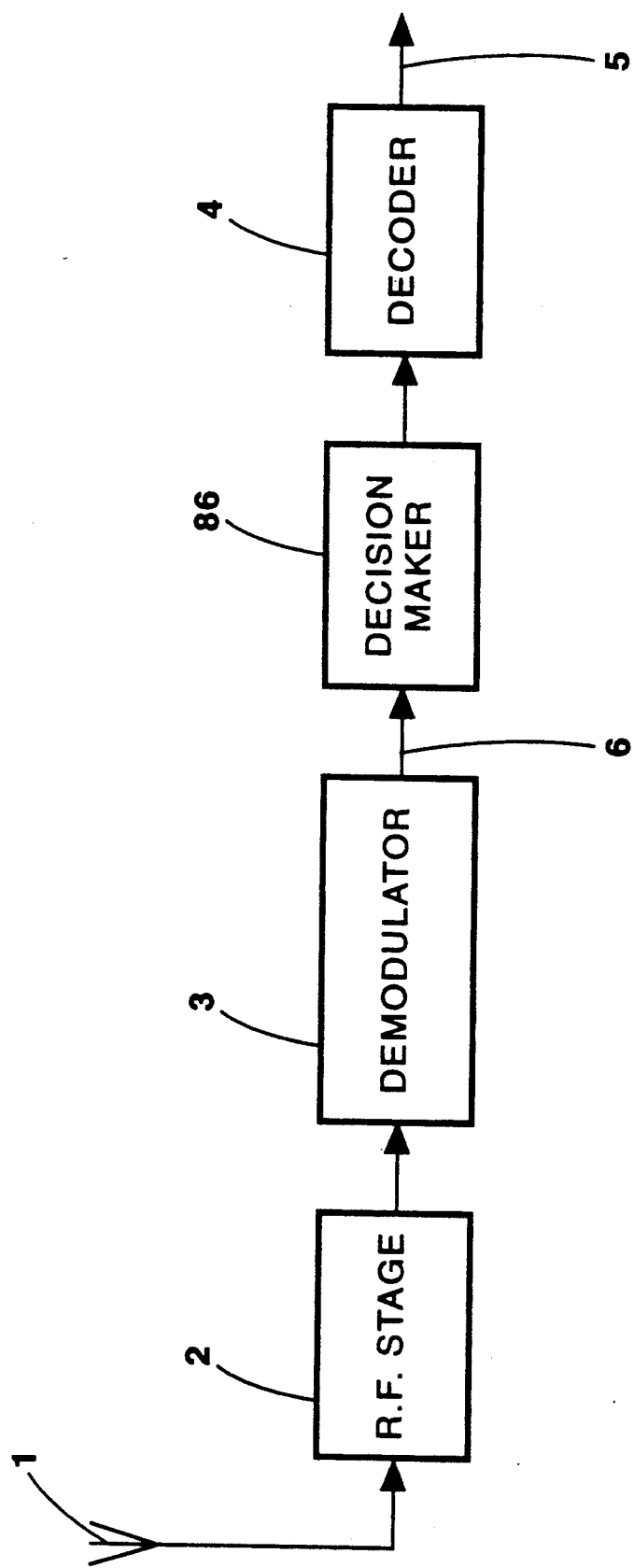
FIG. 1 illustrates in simplified block diagram form a typical digital receiver.

As shown in FIG. 1, it can be seen that a typical digital radio communications receiver consists of an antenna 1, RF (radio frequency) stage 2, demodulator comprising a decision variable extractor 3 and decision maker 86, and decoder 4. The antenna 1 picks up transmissions which are then amplified and conditioned in the RF stage 2. The demodulator reduces the received signal ready for the decoder 4 to decode the symbol sent.

The decision variable extractor 3 forms one or more decision variables from the received signal. The decision maker 86 provides an output for the decoder 4 to decode.

The output signal 5 of the decoder 4 is often characterised, in a binary system, as being a series of discrete bits. A transmitter can, in function, be considered as the reverse of a receiver. It will be appreciated that the receiver illustrated in FIG. 1 is for the example a radio receiver. It could be any other type of digital communication receiver using other transmission mediums. However, only for the sake of clarity, the embodiments below will be described in reference to radio communication links and associated equipment. This is not to be taken as a limitation to the invention which can be, for example used, for baseband signals as well as heterodyned signals.

A decision variable or variables 6 are obtained from the output of the decision variable extractor 3.

In some receivers the decision variable 6 can not be directly accessed because the stages of decision variable extractor 3 and decision maker 86 are combined. In such cases these stages can be replicated allowing access to the decision variable 6.

The decision variable 6 is characterised by being a random variable of continuous values, whereas the bit stream of the output signal 5 is discrete in value.

Figure 2:
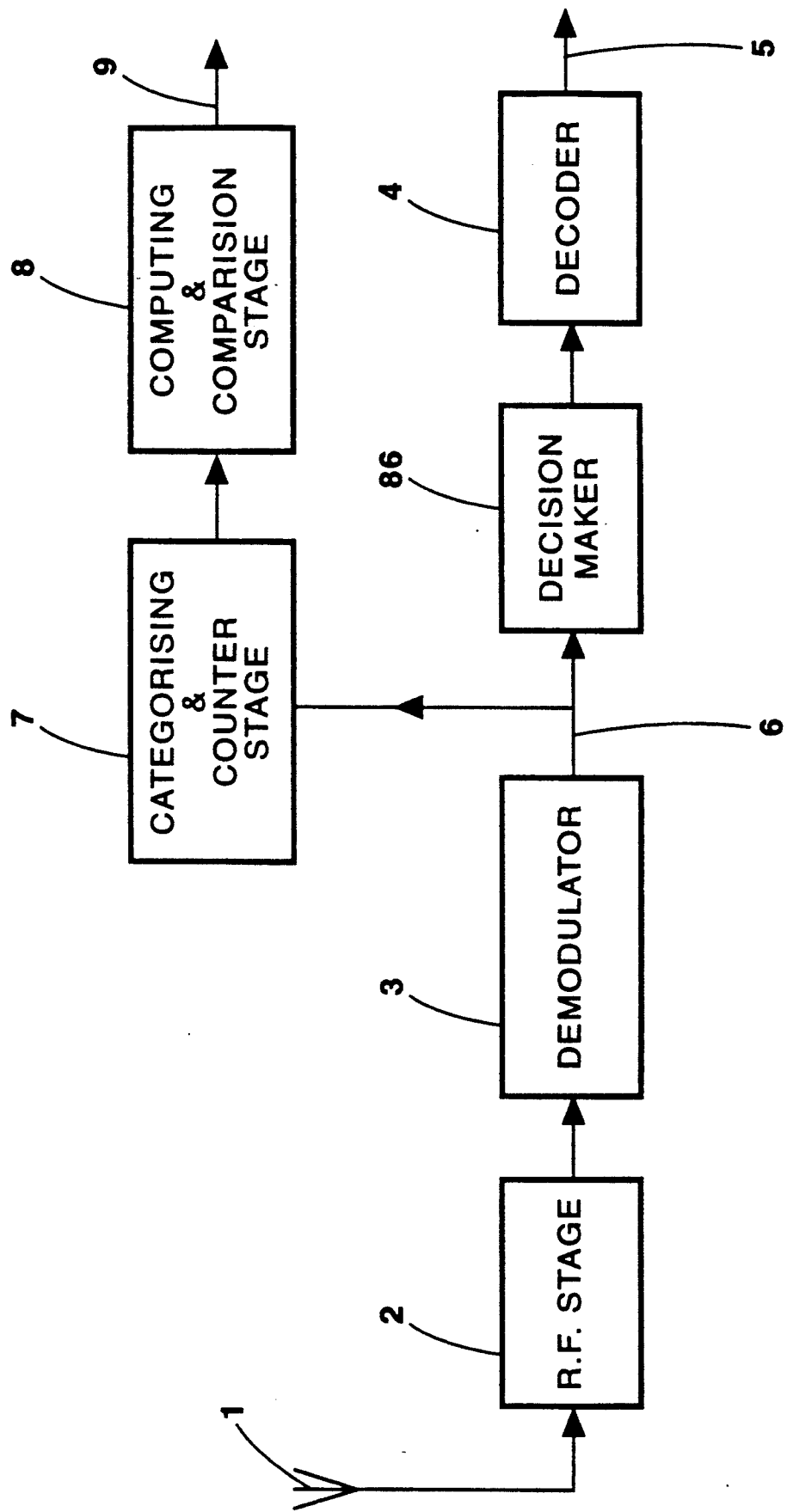
FIG. 2 shows in block diagram form a digital receiver exhibiting the invention in a preferred form.

Referring to FIG. 2, here the digital communication receiver is illustrated with the invention applied to it. This receiver again consists of an antenna 1, RF stage 2, demodulator comprising a decision variable extractor 3 and decision maker 86, decoder 4, decision variable 6, and further a categorising and counter stage 7, and a computing and comparison stage 8. The computing and comparison stage 8 provides a bit error rate signal 9 as an output.

Figure 3:
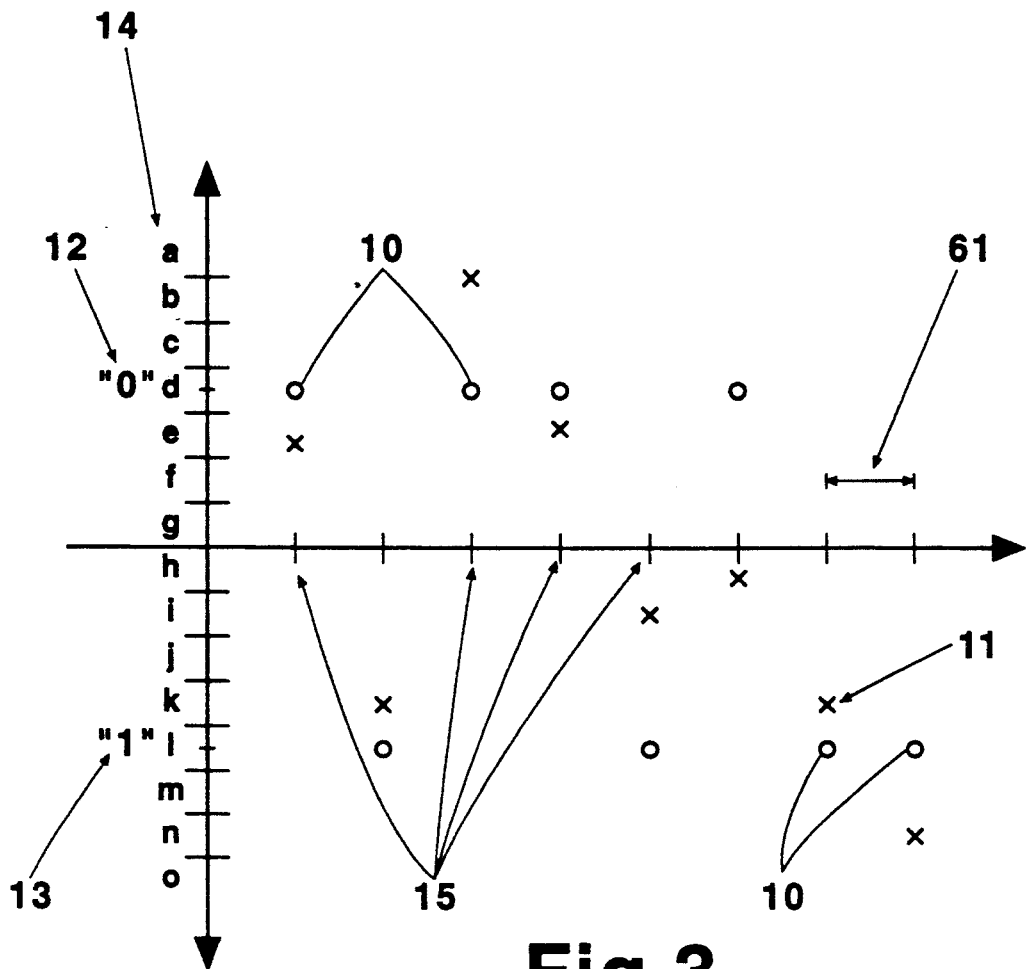
FIG. 3 shows a sketch of how a decision variable may be categorised, showing an ideal receive waveform (decision variable) and what might be received.

To obtain a measured histogram to estimate the probability density function of the communication link, the decision variable is categorised into a number of categories. To explain this by example, FIG. 3 illustrates an ideal waveform indicated by circles (examples being shown by 10) of a decision variable as would be received if there was no disturbances in the communication link and the waveform indicated by crosses (example being shown by 11) that that might be received in a typical operating system. Here the waveforms 10 and 11 are both forms that the decision variable may take.

The decision variable ideally has values of "zero" illustrated at point 12 or "one" illustrated by point 13. The value of the decision variable is categorised into categories a, b, c, d, e, f, g, h, i, j, k, l, m, n, o illustrated by arrow 14.

Within a demodulator the decision variable is sampled in response to a clock signal at points marked by arrows 15. This is emulated whilst obtaining a histogram for the communication link probability density function with the value of the decision variable being categorised into which of the categories it falls within at the time of the clock signal.

Figure 4:
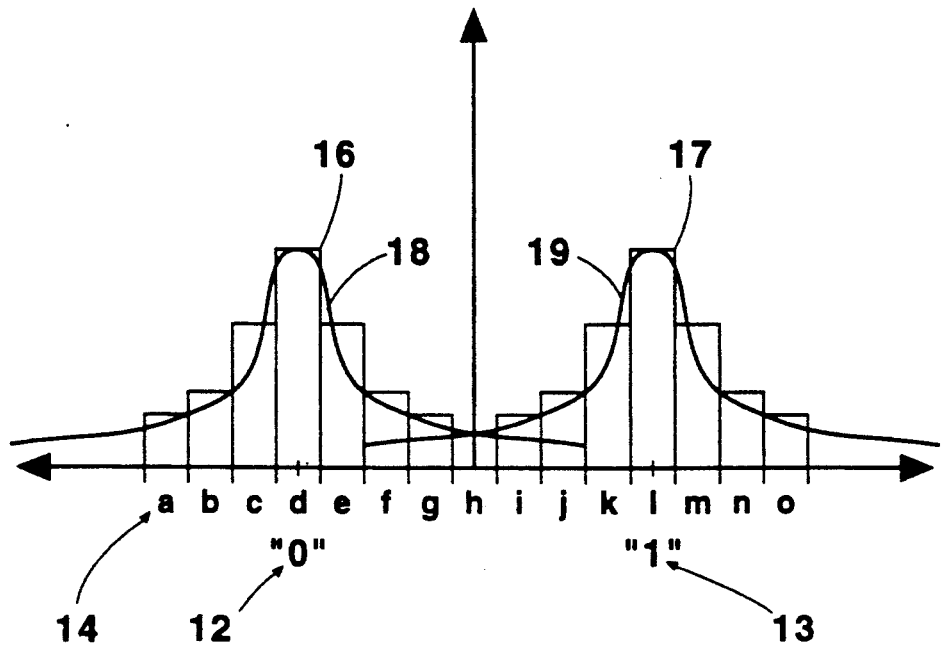
FIG. 4 illustrates a probability density function and a histogram estimation of it using the categories as illustrated in FIG. 3.

Over a number of symbol periods, one being illustrated by arrow 61, the count within the categories 14, estimates the communication link probability density function. This is illustrated in FIG. 4 where the histograms 16 and 17 approximate the probability density functions 18 and 19 respectively for the example illustrated in FIG. 3. The histogram is an accumulation of occurrence of decision variables being categorised in a particular category.

Figure 5:
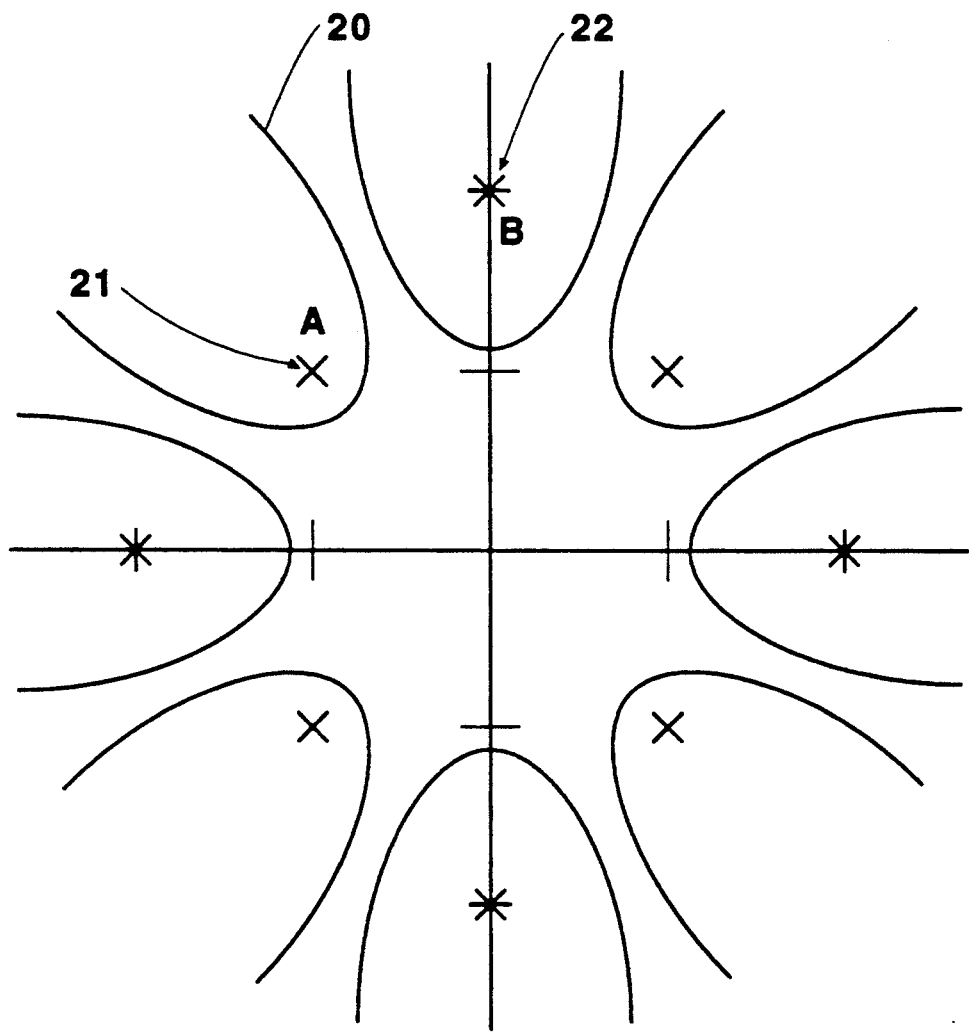
FIG. 5 shows possible threshold regions for categorising a phasor, using in this example, an 8 QAM (Quadrature Amplitude Modulation) system.

In determining the categories into which the decision variable may be categorised the regions of magnitude of the decision variable can be linearly spaced as in FIGS. 3 or 4, or non-linearly spaced. Consequently, categories may be selected to be close about the decision variable value or values where the demodulator decides what symbol was sent. In providing a system equal in performance as general active bit rate monitors it has been found that this is not necessary to obtain satisfactory and comparable performance. Hence, because of the easier implementations, it is preferred to use linear spacing of the categories.

Where the modulation scheme used is more complex than that illustrated in FIG. 3 then a symbol may have associated with it a number of decision variables. In the case of quadrature amplitude modulation the phasor to each symbol can be categorised into different regions as illustrated in FIG. 5. In this Figure as an example each symbol has a bounded region about it which if the phasor fell within that region then it is 50% likely that the phasor is meant to represent the nearest symbol, and if outside such a region it is 50% likely that it was not meant to be that symbol. It is pointed out that this is only a sketch and is for illustrative purposes only.

In this example, a phasor falling within a region bounded by 50% likelihood line 20 would be 50% or more likely to be meant as symbol "A" marked as 21, whereas a phasor falling in a region outside that marked by line 20 would be indeterminable. The situation for symbol "B" marked as 22 is similar as for symbol 21. This is true for the other symbols.

FIG. 5 shows that the decision variable as a phasor can be used to determine symbols. In practice it is preferred to reduce the phasor into its constituent decision variables; in this case phase and amplitude.

As an alternative, it is preferred, for simplicity sake, to use circles about each symbol ideal position instead of the regions as shown in FIG. 5. However, in the interest of obtaining maximum performance at the expense of simplicity it is possible to use such regions which can be selected as follows.

The first step is to determine the categories into which the incoming decision variables are sorted. One preferred way of doing this is by dividing the probability space into the regions conforming to the categories where the boundary between categories are lines of equal likelihood ratio. For a number of discrete symbol values that a decision value can take then for symbol A:

$$K = \frac{P(A)}{P(A^*)}$$

where:
P(A)=probability of decision variable being a symbol A, one of the discrete symbol values;
P(A*)=probability of decision variable not being symbol A, but another of the discrete symbol values
K=a constant, the value of which is changed for determining the other boundaries of categories between symbols A and other symbols.

For a two category system this is as illustrated in FIG. 5.

The probability function used to determine the boundaries of the categories is preferably the most expected probability function for the channel. Thus the system can be tuned for the expected probability function of the channel or link.

As mentioned above, an optimal design for a particular channel probability distribution at a given error rate is done by choosing the spacing between regions. This is obtained at the expense of complexity for little better performance. For the manufacture of a bit error rate monitor providing similar accuracy as known monitors using active methods this complexity is not found to be necessary, consequently simple and generally linear regions or categories of the decision variable are preferred.

Figure 6:
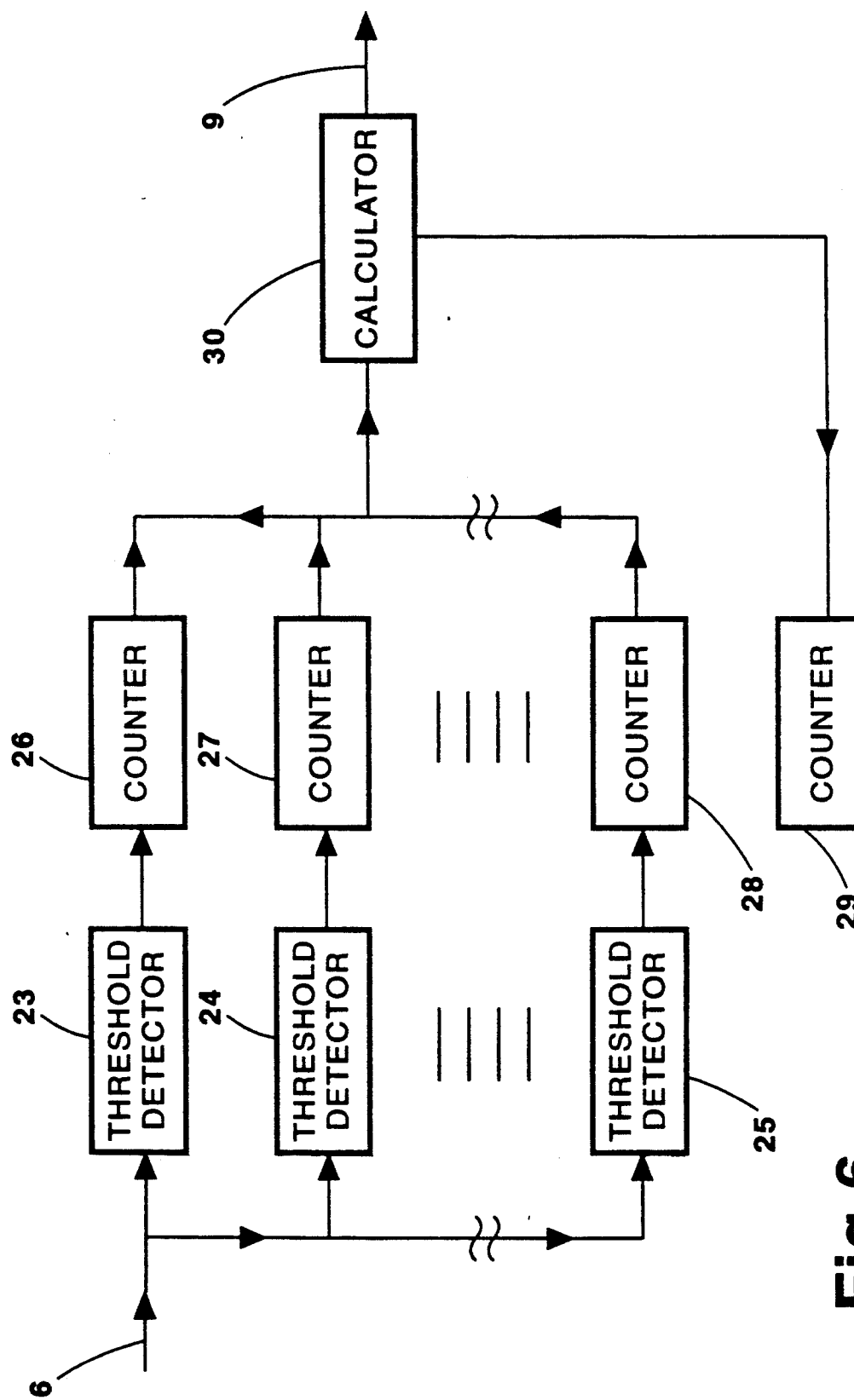
FIG. 6 illustrates in block diagram form the selection of which stored probability histogram is best estimated by the measured histogram according to a first preferred embodiment.

In FIG. 6 which illustrates the selection of which stored probability histogram is best estimated by the measured histogram according to a first preferred embodiment, the decision variable 6 is applied to a number of threshold detectors 23, 24, 25. Each threshold detector is connected to a respective counter 26, 27, 28. It will be appreciated that threshold detector 25 and counter 28 are the last of a series of such devices. The more threshold detectors, then the more categories into which a decision variable is categorised and the greater accuracy that may be achieved. It has been found that a series of 4 categories which in turn means 4 threshold detectors and 4 counters will provide an estimate of the bit error rate down to $10^{-4}$ bit error rate for a 2400 bit per second link using 4000 samples with performance comparable with known bit error rate monitors using 100000 samples.

The outputs of the counters 26, 27, 28 are compared with stored histograms of known probability density functions stored in memory means 29. These are compared by calculating 30 which may be a computer. The output of the calculating means 30 is the bit error rate 9 associated with the probability density function of the stored histogram selected as being closest resembling the measured histogram according to the counts in the counters 26, 27, 28.

The embodiment of FIG. 6 provides in the counters a category cumulative estimation of the probability density function of the link. This is due to the use of simple-value exceeded threshold detectors, instead of threshold detectors which detect if the decision variable falls within a range of values. The calculating means 30 may convert the category cumulative estimation of the probability density function to a category non-cumulative probability density function simply by subtracting the values of counters for higher thresholds from counts of lower thresholds. Alternatively the comparison can be made using category cumulative probability density functions. More is said about this later.

In this embodiment, it is preferred to use category cumulative probability density functions.

Figure 7:
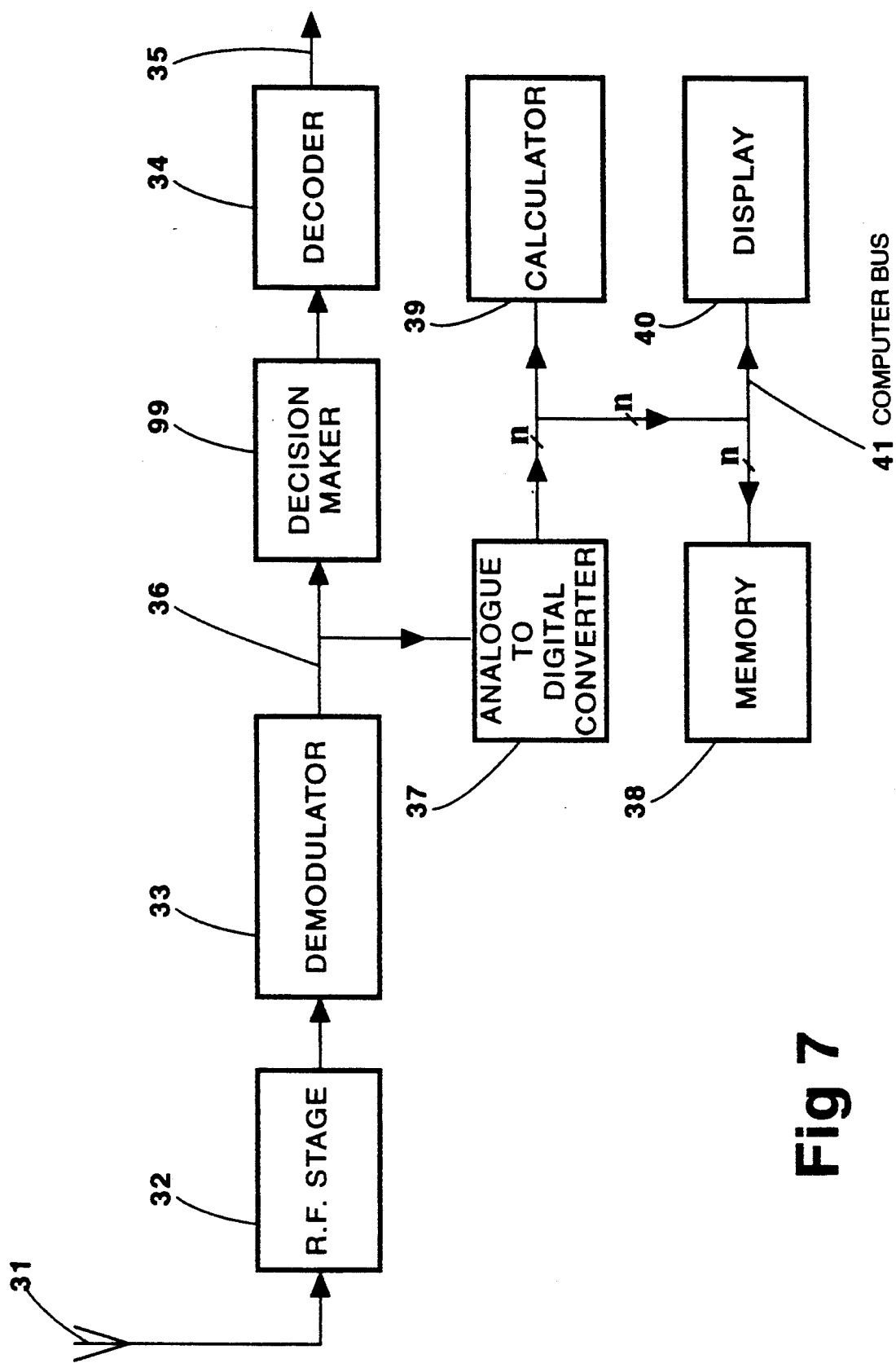
FIG. 7 illustrates a second preferred embodiment in block diagram form exhibiting the present invention.

In a second preferred embodiment illustrated in FIG. 7 the receiver consists of an antenna 31, RF stage 32, demodulator consisting of a decision variable extractor 33 and decision maker 99, and decoder 34. Signal 35 is the bit stream output of the decoder 34.

A decision variable 36 is digitised by an analogue to digital converter 37. The output of the analogue to digital converter 37 is categorised into a number of categories or thresholds by a calculating means 39 such as a microprocessor or computer.

Each time the decision variable is interpreted by the decoder 34 the value of the analogue to digital converter is assessed as to which category it falls within and an associated computer variable is incremented. The microprocessor 39 in conjunction with a display 40 and memory 38 operates in cooperation with the analogue to digital converter 37 to form the measured histogram for the link probability density function.

When required, the microprocessor 39 compares the measured histogram for the communication link, stored in the values of the computer variable for each, category, with stored histograms of probability density functions. The bit error, rate produced as an output is the bit error rate associated with the stored histogram closest resembling the measured histogram.

The analogue to digital converter 37, memory 38, microprocessor 39 and display 40 are connected together via a computer bus 41.

As with the last embodiment, the probability density functions can be either category cumulative or category non-cumulative probability density functions. Because of the ease of implementations it is preferred to use category non-cumulative probability functions.

Figure 8:
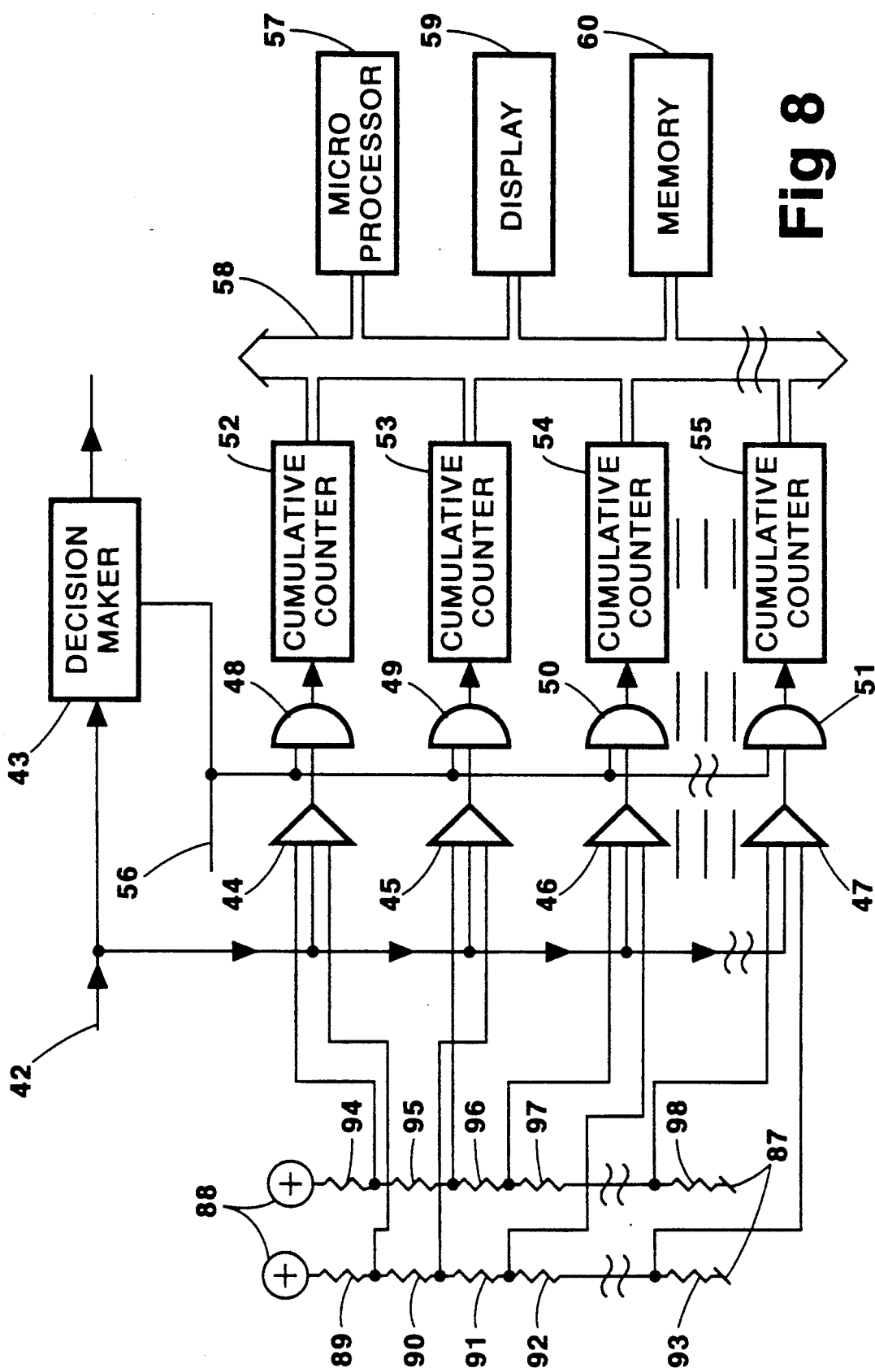
FIG. 8 illustrates a third preferred embodiment in block diagram form exhibiting the present invention.

A third preferred embodiment is illustrated in FIG. 8. Here the decision variable 42 is applied to the decision maker 43 and also to threshold detectors or comparators 44, 45, 46 and 47. The output of each comparator 44, 45, 46 and 47 is connected to an input of an AND gate 48, 49, 50 and 51 respectively. Here the comparators of the threshold detectors 44, 45, 46 and 47 are adapted to provide a count signal if the decision variable 42 falls within their associated category.

The threshold detectors 44, 45, 46 and 47 are each supplied with two reference voltages. These voltages are developed by use of resistive chains connected between a positive voltage source 88 and a ground or chassis rail 87. The resistive chains consist of resistors 89 to 98 as illustrated, and it will be appreciated that the resistive chains illustrated would be of length suitable to provide the reference voltages to the threshold detectors 44, 45, 46 and 47.

The output of each AND gate 48, 49, 50 and 51 is applied to the input of a category cumulative counter 52, 53, 54 and 55 respectively. The decision maker clock signal 56 is used to determine the instant at which the decision variable is interpreted as a symbol. The signal is also used to determine when the threshold detectors output will be applied to their respective counters by its cooperation with the respective AND gate. In this manner, the decision variable is categorised at the same time that the decision variable is interpreted by the decision maker 43.

In this embodiment the threshold detectors 44, 45, 46 and 47 have an upper and a lower threshold. Thus the associated counter of a threshold detector will only be incremented if the decision variable falls within the category sensed by the threshold detector.

It will be appreciated that whilst only four threshold detectors and counters are illustrated in FIG. 8 there can in fact be a number of such arrangements.

A microprocessor 57 is connected by computer bus 58 to each of the counters 52, 53, 54 and 55. Also connected to the computer bus 58 are display 59 and memory 60.

Upon request, the microprocessor 57 performs a comparison between the measured histogram of the link probability density function as determined by the value of the counters 52, 53, 54, 55 with stored histogram values stored in memory 60. The microprocessor 57 supplies the display 59 with the bit error rate associated with the stored histogram best estimated by the measured histograms.

It is preferred with this embodiment to use category non-cumulative probability density functions.

In the above embodiments the comparison test between the measured histogram and the stored histograms can be conducted by the microprocessor according to a number of different tests. For example, Bayes Criterion, the Method of Maximum Aposteriori Probability, the Method of Maximum Likelihood or the Normalised Least Squares Test can be used to determine the closest matching to the measured histogram stored or library histogram.

The Maximum Aposteriori Test can be written as:

$$\rho(k) = \max_{(\text{over } k)} \{<u,v^{(k)}> + \lambda^{(k)}\}$$

where $$<u,v^{(k)}> = \sum_{j=1}^{M} u_j v_j^{(k)}$$

$u_j$ is the occurrences of the decision variable categorised as being in category j (j=1,2,... M),
M is the total number of categories, $$v_j(k) = \ln\{P_j^{(k)}\}$$

$P_j^{(k)}$ is the expected (reference) probability of occurrences in category j for stored Probability Density Function k (k=1,2,... L), $\lambda^{(k)}$ = Apriori probability of the occurrence of the stored Probability Density Function k (k=1,2,... L), where $$\sum_{k=1}^{L} \lambda^{(k)} = 1,$$

and the choice is by selecting the channel or link state parameter or parameters associated with the stored probability density function resulting in the maximum value for the ρ(k) function.

If all the stored probability density functions are equally likely, that is:

$$\lambda^{(k)} = \frac{1}{L},$$

then the above Maximum Aposteriori Test becomes the Maximum Likelihood Test. The choice is by selecting the channel or link state parameter or parameters associated with the stored probability density function resulting in the maximum value for the ρ(k) function.

The Normalised Least Squares Test can be written as:

$$\rho^{(k)} = \min_{\text{over } k} \left\{ \sum_{j=1}^{M} \frac{(u_j - v_j^{(k)})^2}{v_j^{(k)}} \right\}$$

where
k = 1,2, ... L and is an indicia indicating which of L stored probability density functions the Normalised Least Squares Test is being calculated for,
M is the total number of categories,
$u_j$ = is the occurrences of the decision variable categorised as being in category j (j=1,2,... M),
$v_j^{(k)}$ = is the expected (reference) occurrences in category j for stored Probability Density Function k (k=1,2,... L), and can be written as:

$$v_j^{(k)} = NP_j^{(k)}$$

where $P_j^{(k)}$ is the expected (reference) probability of occurrences in category j for stored Probability Density Function k (k=1,2,... L), and where $$N = \sum_{j=1}^{M} u_j,$$

and is the total number of symbols sent or counts.
The choice is by selecting the channel or link state parameter or parameters associated with the stored probability density function resulting in the minimum value for the $\rho^{(k)}$ function.

The Normalised Leasts Squares Test is recognisable as the Chi Square Test which can be written as:

$$\chi^2 = \sum_{j=1}^{M} \frac{(u_j - v_j)^2}{v_j}$$

and $$v = M - 1$$

where:

M = number of sub-regions or categories,
$u_j$ = occurrences of the decision variable categorised as being in category j,
$v_j$ = expected (reference) occurrences in category j,
$v$ = number of degrees of freedom.

The choice is by selecting the channel or link state parameter or parameters associated with the stored probability density function resulting in the lowest value for the $\chi^2$ function. However, the test used here is not strictly the Chi Square Test as that test is used as a goodness-of-fit hypothesis test and not as a classifier test.

The Normalised Least Squares can be preferably implemented, to choose which of the library probability density functions as best estimated by the observed counts, in a simplified manner as follows:

$$\rho^{(k)} = \min_{(\text{over } k)} \left\{ \sum_{j=1}^{M} \frac{(u_j - v_j^{(k)})^2}{v_j^{(k)}} \right\}$$

as $v_j^{(k)} = N P_j^{(k)}$ then:

$$\rho^{(k)} = \min_{(\text{over } k)} \left\{ \sum_{j=1}^{M} \frac{(u_j - N P_j^{(k)})^2}{N P_j^{(k)}} \right\}$$

as the N in the denominator is independent of k then the choice of $\rho^{(k)}$ is un-effected and may be rewritten as:

$$R^{(k)} = \min_{(\text{over } k)} \left\{ \sum_{j=1}^{M} \frac{(u_j - N P_j^{(k)})^2}{P_j^{(k)}} \right\}$$

Expanding the numerator:

$$R^{(k)} = \min_{(\text{over } k)} \left\{ \sum_{j=1}^{M} \frac{(u_j^2 - 2 u_j N P_j^{(k)} + N^2 P_j^{(k)2})}{P_j^{(k)}} \right\}$$

which may be rewritten as:

$$R^{(k)} = \min_{(\text{over } k)} \left\{ \sum_{j=1}^{M} \frac{u_j^2}{P_j^{(k)}} - 2 u_j N + N^2 P_j^{(k)} \right\}$$

since $2 u_j N$ is not a function of k this will not effect which of the library Probability Functions are chosen and then:

$$r^{(k)} = \min_{(\text{over } k)} \left\{ \sum_{j=1}^{M} \frac{u_j^2}{P_j^{(k)}} + N^2 P_j^{(k)} \right\}$$

and rewritten as:

$$r^{(k)} = \min_{(\text{over } k)} \left\{ \sum_{j=1}^{M} \frac{u_j^2}{P_j^{(k)}} + N^2 \sum_{j=1}^{M} P_j^{(k)} \right\}$$

And since the summation of probabilities of all regions must equal 1, then the choice of which library Probability Density Function which is best estimated by the observed counts can be selected by performing the following calculations:

$$q^{(k)} = \sum_{j=1}^{M} \frac{u_j^2}{P_j^{(k)}}$$

and selecting the library model which yields the least value for $q^{(k)}$.

The Maximun Aposteriori Probability Test may be simplified to form the Maximum Likelihood Test which is:

$$\rho^{(k)} = \min_{(\text{over } k)} \left\{ \sum_{j=1}^{M} u_j \times \ln P_j^{(k)} \right\}$$

where the values of $\ln P_j^{(k)}$ are stored. It is this form that the maximum likelihood test is preferably performed.

Figure 9:
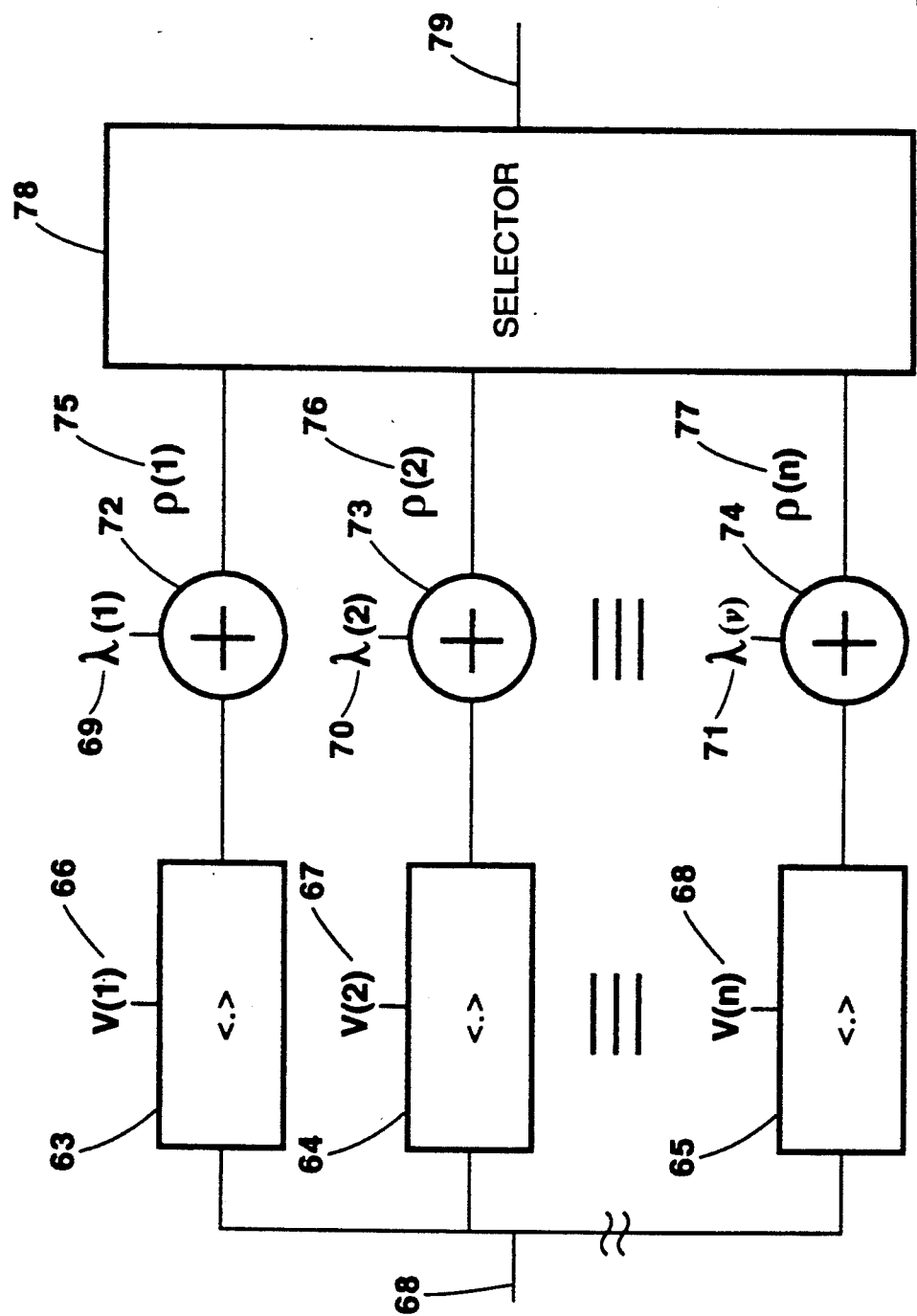
FIG. 9 shows in block diagram form the comparison of the measured histogram with stored histograms utilising the Maximum Aposteriori Probability Test.

In general, the preferred test for determining which of the stored histograms is best estimated by the measured histogram is that of the maximum aposteriori test. This is illustrated in block diagram in FIG. 9.

The decision variable is categorised. Then for each value 62 of each category and the value of $v_j^{(k)}$ associated with the store histogram category, the dot product, $$<u, v^{(k)}> = \sum_{j=1}^{M} u_j v_j^{(k)},$$

is calculated. This is illustrated in blocks 63, 64, 65 each associated with one of the stored histograms. The values of the $v_j^{(k)}$, as inputs 66, 67, and 68, are determined from:

$$v_j^{(k)} = \ln\{P_j^{(k)}\}$$

where $P_j^{(k)}$ is the expected (reference) probability of occurrences in category or state j for the stored Probability Density Function.

The dot product calculated in blocks 63, 64 and 65 is a scalar result to which is added an Apriori probability ($\lambda^{(k)}$) 69, 70 and 71 of the occurrence of the stored Probability Density Function k by adders 72, 73 and 74. The maximum of the scalar outputs 75, 76 and 77 of the adders 72, 73 and 74 is selected by a selector 78. The selector 78 has an output 79 which is the value of the link parameter or parameters associated with the selected stored probability density function.

It will be appreciated that the blocks of 63, 64, 65, 72, 73 and 74, and the associated inputs are parts of a series which has in total n stored probability functions to be compared.

It will also be appreciated that the decision variable being a random variable can have a probability density function as characterised in FIG. 10A which could be estimated by the histogram in FIG. 10C. This requires the decision variable to be categorised into whichever of the categories it falls within. This in fact requires a determination of whether the decision variable for each category is above a certain value and below a certain second value. This form can be referred to as a category non-cumulative probability function. A category non-cumulative probability function requires a more complicated threshold detector than simply a comparator.

A probability density function can also be considered as a category cumulative probability function. This is illustrated in FIG. 10B with its associated histogram illustrated in FIG. 10D. Because the probability density function is being estimated there is no requirement to know the specific value of the decision variable for each category as in FIG. 10A only that the value is above certain values. Consequently the shape of the category cumulative probability density function shown is obtained.

This does require that the stored probability density functions are also category cumulative probability density functions. The effect of this is that only simple threshold detectors need to be used instead of the more complex threshold detectors for the histogram of FIG. 10C. The test procedures are the same though of course the values for the individual histograms would be different.

The invention herein provides significant advantages compared to prior methods. As already mentioned the time required to measure the bit error rate using the active error rate method can be considerable. In fact, the time can be such that the bit error rate determined by it can have limited meaning. This is because the probability density function of the communication link can vary in a short space of time sometimes being less than the required measuring time using the active error rate monitoring technique.

The lower threshold method can perform measurements as quickly as the method of the invention described herein and requires similar number of bits for its measurements. However, the accuracy of a bit error rate monitor using the lower threshold method compared with the bit error rate monitor exhibited in the invention is one or more orders of magnitude worse. This is illustrated in FIGS. 11 and 12.

Figure 11:
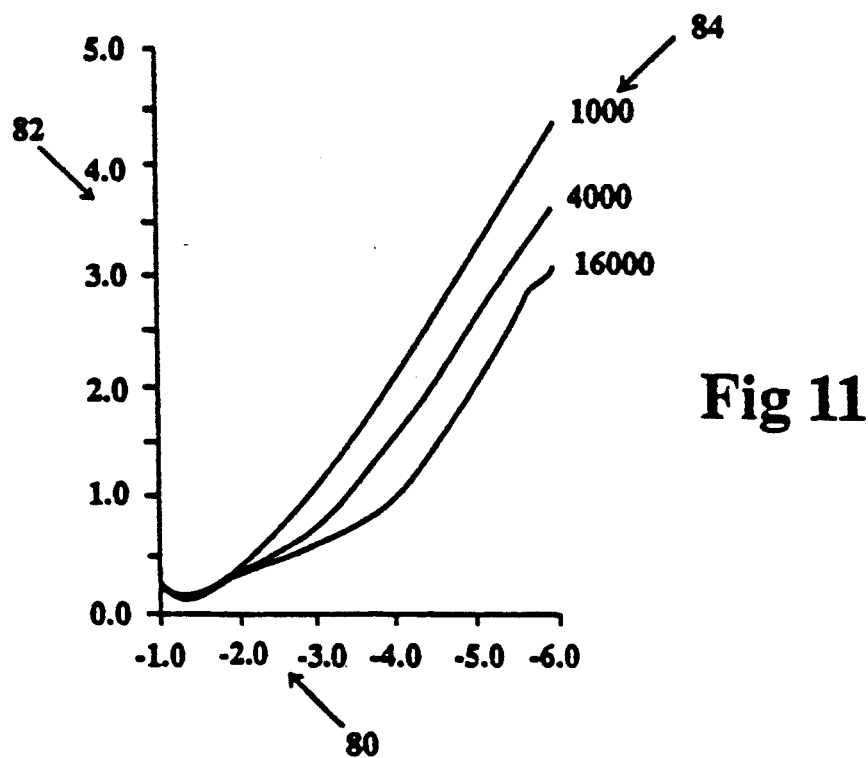
FIG. 11 shows the performance test results of a bit error rate monitor using the lower threshold method.

FIG. 11 shows the performance of a device using the lower threshold method using Quadrature Phase Shift Keying modulation in an Additive White Gaussian Noise environment. FIG. 12 shows the performance of a device using Quadrature Phase Shift Keying modulation and the invention disclosed herein in an Additive White Gaussian Noise environment. In FIGS. 11 and 12, the horizontal axes 80 and 81 are the Log of the actual error rate; vertical axes 82 and 83 are $95^{th}$ percentile of difference between predicted error and actual log of bit error rate. The number of samples or bits sent are shown by arrows 84 and 85.

Figure 12:
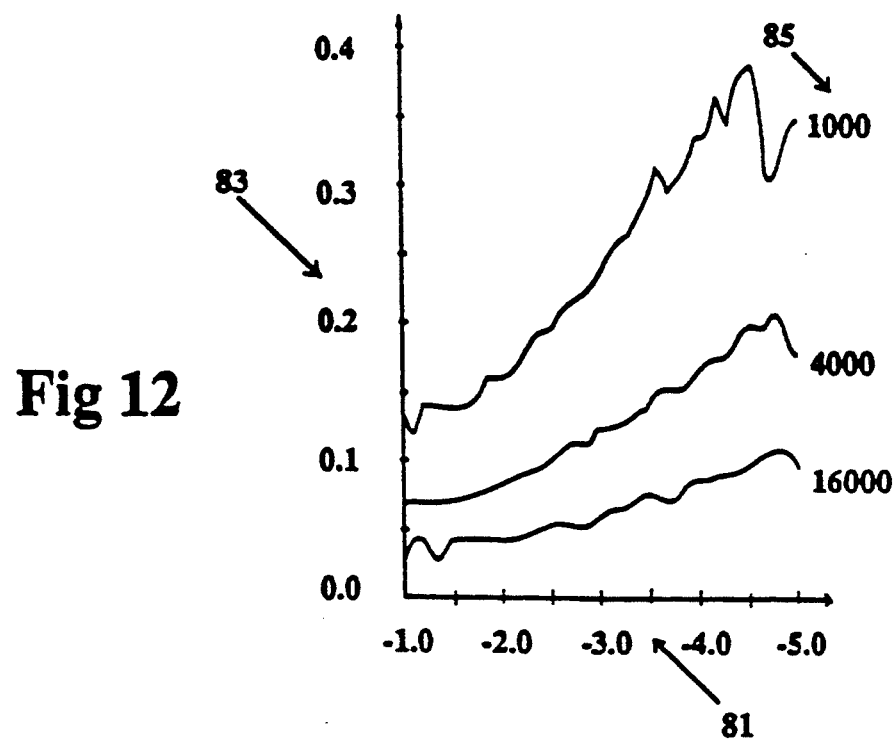
FIG. 12 shows the performance test results of a bit error rate monitor using the concepts of the invention disclosed herein.

It can be seen from FIGS. 11 and 12 that under test conditions, the invention provides a significant improvement in performance. It is also clear that the number of samples required to give a meaningful estimate is very much less than with the active method. Further, if improved accuracy is required, then a larger sample size or more categories or both can be used.

As with any estimation method there is always some uncertainty as to the quality of the estimate. For example, it is known that the probability density functions for a Quadrature Phase Shift Keying modulation scheme in a Rayleigh fading channel with an error rate of $10^{-1.4}$ appears very similar to an Additive White Gaussian Noise channel with an error rate of $10^{-1}$. This is to the extent that the estimation process may not be able to distinguish between the two. The bit error rate associated with such probability density functions is approximately the same but not quite the same. In most known situations the difference is of little practical concern. However, by measuring another link state parameter, in this case detecting variations in the signal to noise ratio, the correct probability function can be selected. This is because a purely Additive White Gaussian Noise link can not have a varying signal to noise ratio whereas such variations are indicative of Rayleigh fading.

To determine whether the signal to noise ration is substantially steady or is varying, a FFT (Fast Fourier Transform) analysis can be conducted on the decision variable over a time interval. The Fourier transform will provide components which are associated with the symbol period, and other components which are associated with noise which are not associated with the symbol period. By observing the noise components, the signal to noise ratio can be assessed as being substantially steady or varying.

It is appreciated that in the majority if not all of communication links parameters such as signal to noise ratio will vary over time. In determining which type of probability density function best approximates the measured estimate, variation which occur over relatively long time spans can be considered as steady parameters. Variations changing relatively quickly would be considered as non-steady parameters.

Once the other parameter has been sensed, in this example signal to noise ratio to determine Rayleigh fading or Additive White Gaussian Noise, then the comparison process can be made with only the correct general type of probability functions. Thus by determining that the signal to noise ratio is steady, only Additive White Gaussian Noise probability density functions need be tested.

The present invention may be used for applications other than estimation of bit error rate or error probabilities. In general, the concept may be used for the estimation of channel or link parameters. Instead of each member in the library model set or stored histograms having an error probability associated with it, a different parameter or set of parameters may be substituted. Such parameters might be the channel type, (i.e. Additive White Gaussian Noise, or Rayleigh Fading), the number of multipaths, the fade rate, signal to noise ratio, or any parameter uniquely identified by a given library distribution. The key to having the device accurately estimate some parameter hinges or how uniquely the characterising distribution identifies it.

The present invention may be used for very rapid short-term probability of error estimation which until this invention has not been possible. High-speed error probability estimation may be applied to the estimation of channel error burst and error clustering distributions on non-stationary channels. Short-term error probability estimates may be averaged over longer time periods to give average error rate estimates.

The present invention may be applied to link sounding and link establishment. In this application the link may be sounded with the actual information carrying signal on one carrier frequency at a time and the error performance rapidly characterised for each frequency. The carrier frequency supporting the lowest bit error rate may then be chosen. Further it may be applied to adapting communication link components as a function of the channel conditions.

The present invention may be used to construct performance profile maps for mobile digital radio applications. In mobile radio systems it has been common to derive a map of the signal strength around a base-station transmitter in order to determine the boundary of reception. This concept may be taken further using the invention to derive a map of error probability at given geographical locations.

The present invention may be used in a system to estimate the error rate after decoding by using the estimated error rate which is the estimate prior to decoding and knowledge of the channel probability density function and the particular error correction scheme used.

The present invention may be applied to all known modulation schemes including baseband signalling schemes.

The present invention should be applicable to any link through which digital transmissions occur. It should be particularly useful over communication channels known to vary in their statistics such as HF radio and mobile radio channels.

As has be shown, the present invention provides a means to quickly asses link state parameters relatable to the link probability density function. It is simple to implement and does not involve high data transmission overheads.

It will be appreciated that the present invention can be applied at least to digital receivers of the types using: soft decision decoding, hard decision decoding, and trellis or combined demodulation decoding.

We claim:

1. A method of assessing a link in a digital communication system comprising the steps of:
   receiving a first signal;
   generating at least one decision variable from the first signal, said at least one decision variable being formed on the basis of which of a plurality of possible first signals was received;
   generating at least one measured probability density function each associated with a corresponding one of said at least one decision variable;
   generating a second signal in response to said at least one measured probability density function; and
   outputting said second signal indicative of at least one of the magnitude and form of at least one channel or link state parameter associated with the digital communication system.

2. A method of assessing a link in a digital communication system according to claim 1, wherein the step of generating said at least one measured probability density function includes the further step of generating a histogram of said at least one measured probability density, said step of generating a histogram comprising the steps of:
   repetitively categorizing each one of said at least one decisions variables into specific categories, each category including a predetermined sub-range of values whereby the collective range of values of all the categories is representative of a range of values which a decision variable can take; and
   recording, for each of said specific categories, one of at least the frequency with which a value of each of said at least one decision variables corresponds to a value within the sub-range of values of said each specific category, and the frequency with which a value of each of said at least one decision variables corresponds to a value which exceeds the sub-range of values of said each specific category.

3. A method of assessing a link in a digital communication system according to 2, wherein said step of generating a second signal includes the steps of:
   comparing said at least one measured probability density functions to stored values and selecting at least one stored value closest in value to said at least one measured probability density functions; and
   generating the second signal on the basis of said at least one stored value.

4. A method of assessing a link in a digital communication system according to claim 3, wherein said step of repetitively categorizing said at least one decision variables is performed while a demodulator generates said at least one decision variables on the basis of which of a plurality of possible first signals was received.

5. A method of assessing a link in a digital communication system according to claim 4, wherein the step of comparing said at least one measured probability density functions to stored values and selecting at least one stored value closest in value to said at least one measured probability density functions, includes the steps of:
   using a Maximum Aposteriori Test to compare each stored value to each said at least one measured probability density function; and
   selecting a stored value for each comparison on the basis of a maximum value resulting from the Maximum Aposteriori Test.

6. A method of assessing a link in a digital communication system according to claim 5, wherein the Maximum Aposteriori Test is as follows:

$$\rho^{(k)} = \max_{(\text{over } k)} \{<u,v^{(k)}> + \lambda^{(k)}\}$$

where
   $k=1, 2, \ldots L$,
   k being an indicia representative of which of L stored values the Maximum Aposteriori Test is being calculated for, $$<u,v^{(k)}> = \sum_{j=1}^{M} u_j v_j^{(k)}$$

$u_j$ is the occurrence of a decision variable categorized as being in category j ($j=1, 2, \ldots M$), M being the total number of categories,
   $\lambda^{(k)}$ = Apriori probability of the occurrence of the stored Probability Density Function k ($k=1, 2, \ldots L$), where $$\sum_{k=1}^{L} \lambda^{(k)} = 1,$$

and $v_j^{(k)}$ is the stored expected occurrences in category j for stored Probability Density Function k ($k=1, 2, \ldots L$) which can be written as:

$$v_j^{(k)} = \ln\{P_j^{(k)}\}$$

where
   $P_j^{(k)}$ is the expected (reference) probability of occurrences in category j for stored Probability Density Function k ($k=1, 2, \ldots L$).

7. A method of assessing a link in a digital communication system according to claim 4, wherein the step of comparing said at least one measured probability density functions to stored values and selecting at least one stored value closest in value to said at least one measured probability density functions, includes the steps of:

using a Maximum Likelihood Test to compare each stored value to each said at least one measured probability density function; and selecting a stored value for each comparison on the basis of a maximum value resulting from the Maximum Likelihood Test.

8. A method of assessing a link in a digital communication system according to claim 6, wherein the Maximum Aposteriori Test is equivalent to a Maximum Likelihood Test when:

$$\lambda^{(k)} = \frac{1}{L},$$

where
k = 1, 2, ... L,
k being an indicia representative of which of L stored values the Maximum Likelihood Test is being calculated for, and
$\lambda^{(k)}$ = Apriori probability of the occurrence of the stored value k (where k = 1, 2, ... L).

9. A method of assessing a link in a digital communication system according to claim 8, wherein the Maximum Likelihood Test, expressed in simplified form, is as follows:

$$\rho^{(k)} = \min_{(\text{over } k)} \left( \sum_{j=1}^{M} u_j \times \ln P_j^{(k)} \right)$$

where the values of $\ln P_j^{(k)}$ are stored parameters.

10. A method of assessing a link in a digital communication system according to claim 4, wherein the step of comparing said at least one measured probability density functions to stored values and selecting at least one stored value closest in value to said at least one measured probability density functions, includes the steps of:

using a Normalized Least Squares Test to compare each stored value to each said at least one measured probability density function; and selecting a stored value for each comparison on the basis of a minimum value resulting from the Normalized Least Squares Test.

11. A method of assessing a link in a digital communication system according to claim 10, wherein the Normalized Least Squares Test is as follows:

$$\rho^{(k)} = \min_{(\text{over } k)} \left\{ \sum_{j=1}^{M} \frac{(u_j - v_j^{(k)})^2}{v_j^{(k)}} \right\}$$

where:
k = 1, 2, ... L,
k being an indicia representative of which of L stored values the Normalized Least Squares Test is being calculated for, and M is the total number of categories,
$u_j$ = is representative of the occurrences of a decision variable categorized in category j (where j = 1, 2, ... M),
$v_j^{(k)}$ = is the expected (reference) occurrences in category j for stored value k (k = 1, 2 ... L), and further expressed as:

$$v_j^{(k)} = N P_j^{(k)}$$

where $P_j^{(k)}$ is the expected (reference) probability of occurrences in category j for stored value k (where k = 1, 2, ... L), and where $$N = \sum_{j=1}^{M} u_j,$$

representative of a total number of symbols sent or counts.

12. A method of assessing a link in a digital communication system according to claim 11, wherein the Normalized Least Squares Test, expressed in simplified form, is as follows:

$$q^{(k)} = \min_{(\text{over } k)} \left( \sum_{j=1}^{M} \frac{u_j^2}{P_j^{(k)}} \right).$$

13. A method of assessing a link in a digital communication system according to claim 2, wherein associated ranges of categories are equal.

14. A method of assessing a link in a digital communication system according to claim 2, wherein associated ranges of categories are non-equal.

15. A method of assessing a link in a digital communication system according to claim 14, wherein, ideally assuming that a value of a decision variable is one of a plurality of discrete symbol values, associated ranges of categories between adjacent discrete values are selected by determining a plurality of boundary lines for adjacent associated ranges such that each boundary line is a line of equal likelihood that a chosen value is within a chosen probability density function.

16. A method of assessing a link in a digital communication system according to claim 15, wherein the boundary lines are selected on the basis of:

$$K = \frac{P(A)}{P(A^*)}$$

where:
P(A) = probability of decision variable being a symbol A, one of the discrete symbol values;
P(A*) = probability of decision variable not being symbol A, but another of the discrete symbol values
K = a constant, the value of which is changed for determining the other boundaries of categories between symbols A and other symbols.

17. A method of assessing a link in a digital communication system according to claim 3, wherein the second signal is representative of a Bit Error Rate for the channel or link associated with the digital communication system.

18. A method of assessing a link in a digital communication system according to claim 3, wherein the probability density functions are of category cumulative form.

19. A method of assessing a link in a digital communication system according to claim 3, wherein probability density functions are of category non-cumulative form.

20. A method of assessing a link in a digital communication system according to claim 3, further comprising the step of pre-selecting which of stored values are to be compared during the comparing step, this pre-selection being made on the basis of a value of a link or channel state parameter.

21. A method of assessing a link in a digital communication system according to claim 20, wherein the value of said link or channel state parameter is a signal-to-noise ratio of the link or channel, the pre-selection step determination being a function of whether the signal-to-noise ratio is a constant or varying parameter.

22. A method of assessing a link in a digital communication system according to claim 21, wherein the preselection step determination of whether the signal-to-noise ratio is a constant or varying parameter includes the steps of:
performing repeated fast fourier transform calculations for each decision variable; and
detecting differences of noise components from one fourier transform calculation to another.

23. A method of assessing a link in a digital communication system comprising the steps of:
using a receiver unit to receive a first signal which includes at least one symbol, said first signal being transmitted from a communication channel or link;
evaluating said first signal and categorizing a decision variable, at repetitive points in time, into a number of states;
on the basis of said states, calculating a probability density function associated with said at least one symbol included in said received first signal; and
generating, in response to the calculated probability density function, a second signal indicative of state parameters of the communication channel or link which transmitted said first signal.

24. A method of assessing a link in a digital communication system according to claim 23, wherein the step of generating said second signal includes the steps of:
performing a comparison of said calculated probability density function with stored values, and selecting which stored value is best estimated by the calculated probability density function; and
generating said second signal on the basis of which stored value is selected.

25. A method of assessing a link in a digital communication system according to claim 24,
wherein the step of calculating a probability density function includes the steps of recording, in discrete histogram form, the occurrences or relative proportion of occurrences that the decision variable, over a number of symbol transmissions, is categorized as being a particular category; and
wherein said stored values, on the basis of which said second signal is generated, correspond to predetermined probability density function values having associated therewith the same number of categories as that of the calculated probability density function.

26. An apparatus for use in a digital communication system comprising:
means for receiving a first signal;
means for demodulating at least one decision variable from the first signal, each decision variable corresponding to one of possible symbols which can be included as part of the first signal;
means for calculating at least one measured probability density function on the basis of the properties of each respective said at least one decision variable; and
generating a second signal, on the basis of said calculated at least one probability density functions, indicative of at least one channel or link state parameter associated with the digital communication system.

27. An apparatus for use in a digital communication system as in claim 26, wherein the means for calculating at least one measured probability density function includes means for generating a histogram of said at least one measured probability density function, said histogram being formed by:
repetitively categorizing each one of said at least one decisions variables into specific categories, each category including a predetermined sub-range of values whereby the collective range of values of all the categories is representative of a range of values which a decision variable can take; and
recording, for each of said specific categories, one of at least the frequency with which a value of each of said at least one decision variables corresponds to a value within the sub-range of values of said each specific category, and the frequency with which a value of each of said at least one decision variables corresponds to a value which exceeds the sub-range of values of said each specific category.

28. An apparatus for use in a digital communication system as in claim 27, wherein said means for generating said second signal includes:
means for comparing said at least one measured probability density function to stored values and selecting at least one stored value closest in value to said at least one measured probability density function; and
means for generating the second signal on the basis of said at least one stored value.

29. An apparatus for use in a digital communication system as in claim 28, wherein the repetitive categorizing of said at least one decision variables is performed while a demodulator generates said at least one decision variables on the basis of which of a plurality of possible first signals was received.

30. An apparatus for use in a digital communication system as in claim 29, wherein the means for comparing said at least one measured probability density functions to stored values and selecting at least one stored value closest in value to said at least one measured probability density functions, is performed by:
using a Maximum Aposteriori Test to compare each stored value to each said at least one measured probability density function; and
selecting a stored value for each comparison on the basis of a maximum value resulting from the Maximum Aposteriori Test.

31. An apparatus for use in a digital communication system as in claim 30, wherein the Maximum Aposteriori Test is as follows:

$$\rho^{(k)} = \max_{(\text{over } k)} \{<u,v^{(k)}> + \lambda^{(k)}\}$$

where
$k = 1, 2, \ldots L$,
k being an indicia representative of which of L stored values the Maximum Aposteriori Test is being calculated for, $$<u,v^{(k)}> = \sum_{j=1}^{M} u_j v_j^{(k)}$$

$u_j$ is the occurrence of a decision variable categorized as being in category j (j=1,2, ... M), M being the total number of categories, $\lambda^{(k)}$=Apriori probability of the occurrence of the stored Probability Density Function k (k=1,2, ... L), where $$\sum_{k=1}^{L} \lambda^{(k)} = 1,$$

and $v_j^{(k)}$ is the stored expected occurrences in category j for stored Probability Density Function k (k=1,2, ... L) which can be written as:

$$v_j^{(k)} = \ln\{P_j^{(k)}\}$$

where $P_j^{(k)}$ is the expected (reference) probability of occurrences in category j for stored Probability Density Function k (k=1,2, ... L).

32. An apparatus for us in a digital communication system as in claim 29, wherein said means for comparing said at least one measured probability density functions to stored values and selecting at least one stored value closest in value to said at least one measured probability density functions, is performed by:
using a Maximum Likelihood Test to compare each stored value to each said at least one measured probability density function; and
selecting a stored value for each comparison on the basis of a maximum value resulting from the Maximum Likelihood Test.

33. An apparatus for use in a digital communication system as in claim 31, wherein the Maximum Aposteriori Test is equivalent to a Maximum Likelihood Test when:

$$\lambda^{(k)} = \frac{1}{L},$$

where
k=1, 2, ... L,
k being an indicia representative of which of L stored values the Maximum Likelihood Test is being calculated for, and
$\lambda^{(k)}$=Apriori probability of the occurrence of the stored value k (where k=1,2, ... L).

34. An apparatus for use in a digital communication system as in claim 33, wherein the Maximum Likelihood Test expressed in simplified form, is as follows:

$$\rho^{(k)} = \min_{(\text{over } k)} \left\{ \sum_{j=1}^{M} u_j \times \ln P_j^{(k)} \right\}$$

where the values of $\ln P_j^{(k)}$ are stored parameters.

35. An apparatus for use in a digital communication system as in claim 29, wherein said means for comparing said at least one measured probability density functions to stored values and selecting at least one stored value closest in value to said at least one measured probability density functions, is performed by:
using a Normalized Least Squares Test to compare each stored value to each said at least one measured probability density function; and
selecting a stored value for each comparison on the basis of a minimum value resulting from the Normalized Least Squares Test.

36. An apparatus for use in a digital communication system as in claim 35, wherein the Normalized Least Squares Test is as follows:

$$\rho^{(k)} = \min_{(\text{over } k)} \left\{ \sum_{j=1}^{M} \frac{(u_j - v_j^{(k)})^2}{v_j^{(k)}} \right\}$$

where:
k=1, 2, ... L,
k being an indicia representative of which of L stored values the Normalized Least Squares Test is being calculated for, and M is the total number of categories,
uj=is representative of the occurrences of a decision variable categorized in category j (where j=1,2, ... M),
$v_j^{(k)}$=is the expected (reference) occurrences in category j for stored value k (k=1,2, ... L), and further expressed as:

$$v_j^{(k)} = N P_j^{(k)}$$

where $P_j^{(k)}$ is the expected (reference) probability of occurrences in category j for stored value k (where k=1,2, ... L), and where $$\text{where } N = \sum_{j=1}^{M} u_j,$$

representative of a total number of symbols sent or counts.

37. An apparatus for use in a digital communication system as in claims 36, wherein the Normalized Least Squares Test, expressed in simplified form, is as follows:

$$q^{(k)} = \min_{(\text{over } k)} \left\{ \sum_{j=1}^{M} \frac{u_j^2}{P_j^{(k)}} \right\}.$$

38. An apparatus for use in a digital communication system as in claim 27, wherein associated ranges of categories are equal.

39. An apparatus for use in a digital communication system as in claim 27, wherein associated ranges of categories are non-equal.

40. An apparatus for use in a digital communication system as in claim 26, wherein the second signal is representative of a Bit Error Rate for the channel or link associated with the digital communication system.

41. An apparatus for use in a digital communication system as in claim 28, further including pre-selection means for pre-selecting which of stored values are to be compared by said comparing means, this pre-selection being made on the basis of a value of a link or channel state parameter.

42. An apparatus for use in a digital communication system as in claim 41, wherein the value of said link or channel state parameter is a signal-to-noise ratio of the link or channel, the pre-selection determination being a function of whether the signal-to-noise ratio is a constant or varying parameter.

43. An apparatus for use in a digital communication system as in claim 42, wherein said preselection means performs the preselection determination of whether the signal-to-noise ratio is a constant or varying parameter by:

performing repeated fast fourier transform calculations for each decision variable; and detecting differences of noise components from one fourier transform calculation to another.

44. An apparatus for use in a digital communication system comprising:

signal generating means for providing onto a channel a first signal;

signal detecting means for detecting the first signal;

signal conditioning means for converting the first signal, detected by said signal detecting means, into at least one output signal representative of a decision variable;

wherein for each said at least one output signal there are provided:

categorizing means for categorizing the decision variable into select dependent categories;

counter means for counting the number of times the value of the decision variable is categorized for each select dependent category;

measuring means for calculating a probability density function associated with the decision variable; and calculating means for providing, for at least one channel, a parameter value dependent upon the measured probability density function.

45. An apparatus for use in a digital communication system comprising:

transmitting means for providing onto a channel a first signal;

means for receiving said first signal; demodulating means for converting the first signal, as received by said receiving means, into at least one output signal representative of a decision variable;

wherein for each said at least one output signal there are provided:

categorizing means for categorizing the decision variable into select dependent categories;

counter means for counting the number of times the value of the decision variable is categorized for each select dependent category;

measuring means for calculating a probability density function associated with the decision variable; and calculating means for providing, for at least one channel, a parameter value dependent upon the measured probability density function.

46. An apparatus for use in a digital communication system comprising:

means for receiving, from a select channel, a first signal;

signal conditioning means for converting the first signal into at least one output signal representative of a decision variable;

wherein for each said at least one output signal there are provided:

categorizing means for categorizing the value of the respective output signal into a plurality of categories;

counter means for determining a number of counting parameters by counting the number of times the value of the respective output signal is categorized in each of said categories, said counting parameters being used to create an estimated histogram defining a measured probability density function;

memory means for storing known probability density functions;

calculating means for comparing which of the known probability density functions is best estimated by the counting parameters stored in the counter means, to identify a best estimated known probability density function; and means for displaying channel or link parameters associated with the best estimated known probability density function.

47. An apparatus for use in a digital communication system as in claim 44, wherein there are a plurality of known probability density functions stored in memory means, and the calculating means is adapted to compare and select which of the stored known probability density functions is best estimated by the counting parameters of the counter means.

48. An apparatus for use in a digital communication system as in claim 47, wherein the categorizing means are threshold detectors, each provided to determine when a signal condition falls within an associated category.

49. An apparatus for use in a digital communication system as in claim 47, wherein the categorizing means are threshold detectors, each provided to determine when a signal condition is within or exceeds an associated category.

50. An apparatus for use in a digital communication system as in claim 47, wherein the categorizing means is an analogue to digital converter operatively coupled to a processor, a display and a memory.

* * * * *